(12) United States Patent
Okabe et al.

(10) Patent No.: US 7,479,072 B2
(45) Date of Patent: Jan. 20, 2009

(54) GOLF BALL

(75) Inventors: Satoko Okabe, Kobe (JP); Takashi Sasaki, Kobe (JP)

(73) Assignee: SRI Sports Limited, Kobe-shi (JP)

( * ) Notice: Subject to any disclaimer, the term of this patent is extended or adjusted under 35 U.S.C. 154(b) by 0 days.

(21) Appl. No.: 11/451,423

(22) Filed: Jun. 13, 2006

(65) Prior Publication Data
US 2006/0287133 A1 Dec. 21, 2006

(30) Foreign Application Priority Data
Jun. 21, 2005 (JP) ............... 2005-181273

(51) Int. Cl.
*A63B 37/12* (2006.01)
(52) U.S. Cl. ....................................... 473/378
(58) Field of Classification Search .............. 473/378, 473/351
See application file for complete search history.

(56) References Cited

U.S. PATENT DOCUMENTS 6,450,900 B2  9/2002  Kametani et al.
6,554,723 B1  4/2003  Kametani et al.
6,824,479 B2 * 11/2004  Isogawa et al. ............. 473/378
2003/0148828 A1 * 8/2003  Isogawa ..................... 473/378

FOREIGN PATENT DOCUMENTS

| JP | 11-114093 A | 4/1999 |
| JP | 11-319147 A | 11/1999 |
| JP | 2003-210617 A | 7/2003 |

* cited by examiner

*Primary Examiner*—Raeann Trimiew
(74) *Attorney, Agent, or Firm*—Birch, Stewart, Kolasch & Birch, LLP

(57) ABSTRACT

The object of the present invention is to provide a golf ball having the individualized appearance as well as the improved visibility, which the mark should inherently provide, by imparting the luster (brilliance) to the mark, without lowering the durability of the mark, even if the mark is printed with the ink composition which the luster material is blended into. The golf ball of the present invention includes a mark made from an ink composition, wherein the ink composition has a pigment, and a luster material having a core layer with a smooth surface and a metal covering the core layer.

19 Claims, 1 Drawing Sheet

GOLF BALL

BACKGROUND OF THE INVENTION

1. Field of the Invention

The present invention relates to a golf ball having a mark thereon, more particularly to a technique which improves the visibility, the durability and the appearance of the mark.

2. Description of the Related Art

A golf ball generally has printed marks such as letters, numbers and drawings to represent a brand name, a play number and the like on a surface of the golf ball body. In recent years, golfers tend to prefer the mark having luxurious and unique appearance. In order to satisfy the preference, there are provided golf balls where the mark having the luster is formed by blending the metal powder and the like into the ink composition for printing the mark.

For example, Japanese patent publication No. H11-114093A discloses a golf ball where the mark is printed with the ink composition comprising a pigment and a metal powder.

Japanese patent publication No. H11-319147A discloses a golf having the mark of the predetermined drawings. The mark is printed with the ink composition comprising the luster-developing component.

Japanese patent publication No. 2003-210617A discloses a golf ball where the mark is printed with the ink composition comprising a metal powder having a resin coating on the surface thereof and a pigment as an essential component.

SUMMARY OF THE INVENTION

In a method of mixing a metal powder or a luster-developing component into the ink composition as disclosed in Japanese patent publication Nos. H11-114093A, H11-319147A and 2003-210617A, the luster of the metal powder and the luster-developing component is weakened by the tinting power (or opacifying power) of the pigment. Thus, the desired luster is not obtained. If the amount of the metal powder or the luster-developing component is increased in order to obtain the desired luster, the adhesion of the mark is lowered. Thus, the mark tends to peel off, when the golf ball is repeatedly hit. As a result, it is not possible to obtain the visibility, which the mark should inherently provide. In addition, if the mark is provided with the luster, it is possible to enhance the visibility of the mark from a long distance as well as impart the luxurious appearance to the mark.

The present invention has been achieved in view of the above circumstances. The object of the present invention is to provide a golf ball having the individualized appearance as well as the improved visibility, which the mark should inherently provide, by imparting the luster (brilliance) to the mark, without lowering the durability of the mark, even if the mark is printed with the ink composition comprising the luster material.

The present invention provides a golf ball comprising a mark made from an ink composition, wherein the ink composition comprises a pigment, and a luster material having a core layer with a smooth surface and a metal coated on the core layer.

Since the luster material used in the present invention has the core layer with the smooth surface and the metal coated on the smooth surface of the core layer, the surface of the metal is also flat. Thus, the luster material used in the present invention provides a high degree of luster than the conventional aluminum flake having the non-smooth surface and the luster thereof is not weakened by the tinting power (or opacifying power) of the pigment. As a result, it is possible to impart the luster to the mark.

According to the present invention, it is possible to obtain the golf ball having the individualized appearance as well as the improved visibility, which the mark should inherently provide, by imparting the luster (brilliance) to the mark, without lowering the durability of the mark, even if the mark is printed with the ink composition comprising the luster material.

DESCRIPTION OF THE PREFERRED EMBODIMENT

Figure 1:
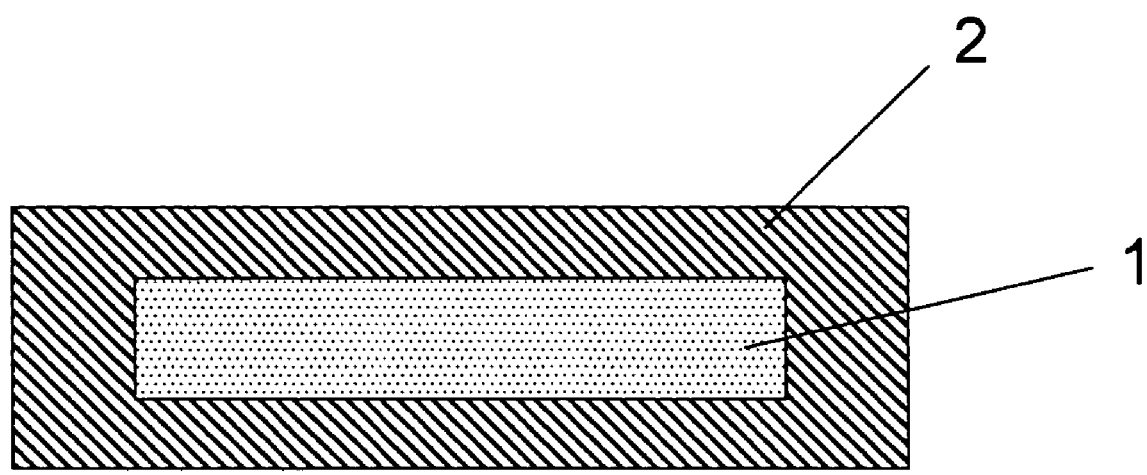
FIG. 1 is a cross-sectional view illustrating an example of the luster material used in the present invention.

The golf ball of the present invention comprises a mark made from an ink composition, wherein the ink composition comprises a pigment, and a luster material having a core layer with a smooth surface and a metal coated on the core layer.

First of all, the ink composition comprising the pigment and the luster material having the core layer with the smooth surface and the metal coated on the core layer will be explained.

Since a thin layer of the metal is coated on the smooth surface of the core layer in the luster material used in the present invention, the surface of the metal layer becomes extremely flat. As a result, light reflectiveness at the surface of the metal layer is enhanced and thus the luster material provides an excellent luster. The core layer having the smooth surface is preferably in the form of a flake or a scale. Examples of the preferable core layer are mica, a pearl flake, a glass flake, a metal flake, and a layer of metal oxide. More preferred is the glass flake, since the glass flake has an extremely smooth surface and thus the surface of the resulting metal layer coated on the core layer becomes extremely flat. Herein, the smoothness of the surface of the core layer is observed by, for example, a scanning electron microscope (SEM).

The metal coated on the core layer preferably includes at least one member selected from the group consisting of gold, silver, nickel, copper, and aluminum. Examples of the metal are an elementary metal of gold, silver, nickel, copper, or aluminum and an alloy of at least two of them. The method of coating the metal on the core layer includes, without limitation, for example, an electroless deposition method, an electrodeposition method, a sputtering method or a vacuum deposition method. Especially, the luster material having the metal layer coated by the electroless deposition method has the purity of 99.99% or more in the metal layer, and thus develops the more excellent luster.

The luster material used in the present invention will be explained, referring to the drawings. FIG. 1 is a cross-sectional view illustrating an example of the luster material used in the present invention. The thin layer of metal 2 is coated on the smooth surface of the core layer 1. Since the surface of the core layer 1 is flat, the surface of the metal layer becomes extremely flat and thus the luster material develops an excellent luster. In the case that the core layer is in the shape of the flake or the scale, if both surfaces of the core layer (top surface and lower surface in FIG. 1) are coated with the metal, the side surfaces of the core layer (left side and right side in FIG. 1) are not necessarily coated with the metal.

The luster material preferably has a number-average particle size of 1 μm or more, more preferably 5 μm or more, even more preferably 10 μm or more, and preferably has a number-average particle size of 500 μm or less, more preferably 300 μm or less, even more preferably 100 μm or less. If the luster material has the number-average particle size of less than 1 μm, the luster becomes weak, while if the luster material has the number-average particle size of more than 500 μm, the durability of the mark is lowered (The mark tends to peel off, due to the impact). The luster material preferably has an average thickness of 0.1 μm or more, more preferably 0.2 μm or more, even more preferably 0.5 μm or more, and has an average thickness of 100 μm or less, more preferably 80 μm or less, even more preferably 50 μm or less. If the luster material has an average thickness of less than 0.1 μm, the luster developed is weak, while if the luster material has an average thickness of more than 100 μm, the durability of the resultant mark is lowered (The mark tends to peel off, due to the impact).

The metal layer coated on the core layer preferably has the thickness of 0.01 μm or more, more preferably 0.02 μm or more, even more preferably 0.05 μm or more, and preferably has the thickness of 0.5 μm or less, more preferably 0.3 μm or less, even more preferably 0.2 μm or less. If the metal layer has the thickness of less than 0.01 μm, the metal layer becomes too thin and the sufficient luster is not obtained. If the metal layer has the thickness of more than 0.5 μm, it is difficult to maintain the surface smoothness of the metal layer. In the case that the thickness of the metal layer is relatively thin (0.5 μm or less), there may be a case that a part of the incident light transmits the metal layer and reflects off the interface between the core layer and the metal layer and the resultant reflected light and the reflected light at the surface of the metal layer produce the light interference.

The luster material used in the present invention is excellent in the dispersibility into the ink composition, and is dispersed in a random manner into the formed mark(oriented at random in the formed mark). As a result, the complex reflection occurs and thus the deep luster is imparted to the wide range of the resultant mark.

The luster material used in the present invention may further be coated with a resin or an inorganic material at the surface of the metal layer coated on the core layer. If the luster material is coated with the resin or the inorganic material, it is possible to avoid the oxidation of the metal and the durability and the weather-resistance will be improved. Examples of the resin are an acrylic resin, a polyurethane resin, a polyester resin, an epoxy resin, a melamine-alkyd resin. The inorganic material includes, for example, an inorganic material comprising silicon dioxide as a main component (preferably an inorganic material consisting of silicon dioxide).

Specific examples of the luster material used in the present invention are "Microglas Metashine (trade mark) MEG 4OPS (a glass flake coated with silver) and MC1040NB (a glass flake coated with nickel)."

The ink composition preferably contains the luster material in an amount of 1 mass % or more, more preferably 3 mass % or more, even more preferably 5 mass % or more, and preferably contains the luster material in an amount of less than 45 mass %, more preferably 30 mass % or less, even more preferably 20 mass % or less, most preferably 10 mass % or less. If the amount is less than 1 mass %, the sufficient luster may not be obtained, since the amount of the luster material is too little, while if the amount is not less than 45 mass %, the durability or the adhesion to the paint is lowered due to the excess amount of the luster material contained in the ink composition.

The pigment contained in the ink composition used in the present invention is a pigment used for coloring an article and includes a white or colored inorganic compound or organic compound that are not dissolved into a medium such as water, oil, and solvents.

The pigment is not limited, as long as it imparts a desired color to the mark. The pigment, for example, includes an inorganic pigment and an organic pigment. Examples of the pigments are a black pigment such as carbon black; a white pigment such as titanium oxide; blue pigments such as ultramarine blue, cobalt blue, and phthalocyanine blue; violet pigments such as anthraquinone violet, dioxane violet, and methyl violet; yellow pigments such as titanium yellow ($20TiO_2$—$NiO$—$Sb_2O_3$), litharge ($PbO$), chrome yellow ($PbCrO_4$), yellow iron oxide ($FeO(OH)$), cadmium yellow, pigment yellow-1, and pigment yellow-12; and red pigments such as red iron oxide ($Fe_2O_3$), red lead oxide ($Pb_3O_4$), molybdenum red, and cadmium red, pigment red-3, pigmentred-57 and pigment orange-13. These pigments may be used either alone or as a mixture of two or more of them.

The ink composition preferably contains the pigment in an amount of 0.5 mass % or more, more preferably 1 mass % or more, and preferably contains the pigment in an amount of 20 mass % or less, more preferably 10 mass % or less. If the amount is less than 0.5 mass %, the mark is pale in color, while if the amount is more than 20 mass %, the luster material hardly develops the luster, because the color of the pigment is too strong.

In the present invention, it is preferable to balance the content of the pigment with that of the luster material in the ink composition, since the balance of the durability, the visibility and the luster can be adjusted.

The ratio of the content of the luster material to that of the pigment (luster material [mass %]/pigment [mass %]) is preferably 0.1 or more, more preferably 0.5 or more, even more preferably 1 or more, and is preferably 50 or less, more preferably 40 or less, even more preferably 30 or less. If the ratio is less than 0.1, the content ratio of the luster material to the pigment is too low for the luster material to develop the sufficient luster. If the ratio is more than 50, the content of the luster material contained in the ink composition is too high, and thus the durability and the adhesion to the paint may be lowered in some cases.

The ink composition of the present invention preferably contains a base resin in addition to the luster material and the pigment, and may further contain a solvent, a plasticizer and other additives where necessary.

The base resin includes a resin conventionally used for the ink composition for the golf ball mark. The base resin, for example, without limitation, includes a polyester resin, an epoxy resin, a soluble nitrocellulose, an acrylic resin, a vinyl chloride-vinyl acetate copolymer, a urethane resin, a polyamide resin and the like. Among them, the epoxy resin and the polyester resin and the soluble nitrocellulose are preferable, because they provide a good adhesion. In the case that the epoxy resin is used as the base resin, polyisocyanates such as hexamethylene diisocyanate, isophorone diisocyanate, tolylene diisocyanate are preferably used as a curing agent.

The ink composition preferably contains the base resin in an amount of 15 mass. % or more, more preferably 20 mass % or more, and preferably contains the base resin in an amount of 50 mass % or less, more preferably 45 mass % or less, even more preferably 40 mass % or less. If the content of the base resin is less than 15 mass %, the adhesion of the mark to the golf ball body becomes low, while if the content is more than 50 mass %, the blending amount of the solvent and the pigment becomes relatively low, and thus the color of the resultant mark is getting tint.

As the solvent, a solvent conventionally used for the ink composition for the golf ball mark can be employed. The solvent includes, without limitation, cyclohexanone, acetylacetone, propyleneglycol monomethylether acetate, methoxymethylbutylacetate, ethylacetate, an aromatic hydrocarbon, or a mixture of at least two of them.

The ink composition preferably contains the solvent in an amount of 20 mass % or more, more preferably 25 mass % or more, even more preferably 30 mass % or more, and preferably contains 60 mass % or less, more preferably 55 mass % or less. If the content of the solvent is less than 20 mass %, the viscosity of the ink composition is so high that the printworkability is lowered, while if the content of the solvent is more than 60 mass %, it takes a longer time to dry the mark after printed, and the productivity of the golf ball is lowered.

The additives include, for example, a flatting agent, a defoamer, an antisettling agent and the like. Examples of the flatting agent are colloidal silica, a low density polyethylene particle, or a medium density polyethylene particle. As the defoamer, preferred is methylsiloxane. The content of the flatting agent contained in the ink composition is preferably, but not limited to, from 0.5 mass % to 5 mass %. The content of the defoamer contained in the ink composition is preferably from 0.5 to 5 mass %. As the antisettling agent, anhydrous silica, an acrylic viscosity modifier, oxidized polyethylene, activated polyamide wax, and bentonite and the like can be used. The content of the antisettling agent is preferably from 0.01 to 3.0 mass %. As the antisettling agent, preferred is aerosil (anhydrous silica) available from NIPPON AEROSIL Co., LTD.

The ink composition used in the present invention preferably contains non-volatiles in an amount of 20 mass % or more, more preferably 30 mass % or more, even more preferably 35 mass % or more and preferably contains non-volatile component in an amount of 70 mass % or less, more preferably 60 mass % or less, even more preferably 55 mass % or less. If the content of the non-volatile component is less than 20 mass %, "color shading" or "transparency" of the mark may occur. On the other hand, if the content is more than 70 mass %, the viscosity of the ink composition becomes too high, and the printability may be lowered in some cases.

Each content of the luster material, the pigment, the solvent, the base resin, and other additives is appropriately determined from the ranges mentioned above so that the total amount of the ink composition becomes 100 mass %.

The golf ball of the present invention has no limitation on its structure and includes a one-piece golf ball, a two-piece golf ball, a multi-piece golf ball comprising at least three layers, and a wound-core golf ball. The present invention can be applied for all types of the golf ball.

In the following, the method for preparing the golf ball of the present invention will be explained based on the embodiment of the two-piece golf ball, but the present invention is not limited to the two-piece golf ball and the process explained below.

The present invention can employ any core which is well-known as the core for the two-piece golf ball. The core of the two-piece golf ball, for example, without limitation, is preferably a molded body which is formed by vulcanizing a rubber composition. The rubber composition comprises, for example, a base rubber, a co-crosslinking agent, a crosslinking initiator, a filler, and an antioxidant.

The base rubber preferably includes a natural rubber and/or a synthetic rubber. Examples of the base rubber are butadiene rubber (BR), ethylene-propylene-diene terpolymer (EPDM), isoprene rubber (IR), styrene-butadiene rubber (SBR), and acrylonitrile-butadiene rubber (NBR). Among them, butadiene rubber, particularly cis-1,4-polybutadiene, is preferable in view of its superior repulsion property. Typically preferred is the high cis-polybutadiene rubber having cis-1,4 bond in a proportion of not less than 40%, more preferably not less than 70%, even more preferably not less than 90%.

As the crosslinking initiator, an organic peroxide is preferably used. Examples of the organic peroxide for use in the present invention are dicumyl peroxide, 1,1-bis(t-butylperoxy)-3,5-trimethylcyclohexane, 2,5-dimethyl-2,5-di(t-butylperoxy)hexane, and di-t-butyl peroxide. Among them, dicumyl peroxide is preferable. The amount of the organic peroxide to be blended in the rubber composition is preferably not less than 0.3 part by mass, more preferably not less than 0.4 part by mass, and preferably not more than 5 parts by mass, more preferably not more than 3 parts by mass based on 100 parts by mass of the base rubber. If the content is less than 0.3 part by mass, the core becomes too soft, and the resilience tends to be lowered, and if the content is more than 5 parts by mass, the core becomes too hard and the shot feeling may be lowered.

The co-crosslinking agent used in the present invention includes, for example, an α,β-unsaturated carboxylic acid having 3 to 8 carbon atoms or a metal salt thereof. As the metal forming the metal salt of the α,β-unsaturated carboxylic acid, a monovalent or divalent metal such as zinc, magnesium, calcium, aluminum and sodium is preferably used. Among them, zinc is preferable, because it can impart the higher repulsion property to the golf ball. Specific examples of the α,β-unsaturated carboxylic acid or a metal salt thereof are acrylic acid, methacrylic acid, zinc acrylate, and zinc methacrylate.

The amount of the co-crosslinking agent to be blended in the rubber composition is preferably not less than 10 parts by mass, more preferably not less than 15 parts by mass, even more preferably not less than 20 parts by mass, and preferably not more than 55 parts by mass, more preferably not more than 50 parts by mass, even more preferably not more than 48 parts by mass based on 100 parts by mass of the base rubber. If the content of the co-crosslinking agent is less than 10 parts by mass, the amount of the organic peroxide must be increased to provide the appropriate hardness, and thus the resilience tends to be lowered. On the other hand, if the content of the co-crosslinking agent is more than 55 parts by mass, the core becomes too hard and thus the shot feeling may be lowered.

As the filler, a filler conventionally formulated in the core of the golf ball can be used. The filler includes, for example, an inorganic salt such as zinc oxide, barium sulfate and calcium carbonate, a high gravity metal powder such as tungsten powder, and molybdenum powder and the mixture thereof. The content of the filler is preferably not less than 0.5 part by mass, more preferably not less than 1 part by mass, and is preferably not more than 30 parts by mass, more preferably not more than 20 parts by mass. If the content is less than 0.5 part by mass, it would be difficult to adjust the gravity, while if the content is more than 30 parts by mass, the ratio of the rubber contained in the whole core becomes low and thus the resilience is lowered.

The rubber composition for the core may further include an organic sulfur compound, an antioxidant, or a peptizing agent, as required in addition to the base rubber, the co-crosslinking agent, the crosslinking initiator and the filler. The amount of the antioxidant is not less than 0.1 part and not more than 1 part with respect to 100 parts of the base rubber by mass. The amount of the peptizing agent is not less than 0.1 part and not more than 5 parts with respect to 100 parts of the base rubber by mass.

The core is formed by kneading the above rubber composition and press-molding it into the spherical body in the mold. The conditions for the press-molding should be determined depending on the rubber composition. The press-molding is preferably carried out for 10 to 40 minutes at the temperature of 130 to 180° C. under the pressure of 2.9 MPa to 11.8 MPa.

The core thus obtained is covered with the cover composition to form a golf ball body. The cover composition, for example, includes a thermoplastic resin such as an ionomer resin, a urethane resin; a two-component curing type urethane resin; a balata and a hard rubber. As a method of forming the cover, typically employed is a method including previously molding the cover composition into two hemispherical half shells, covering the core together with the two half shells, and subjecting the core with two half shells to the pressure molding, or a method including injection-molding the cover composition directly onto the core to form a cover. Further, when forming the cover, the cover can be formed with a multiplicity of concavities, which is so called "dimple", at the surface thereof. As required, the surface of the golf ball can be subjected to grinding treatment such as sandblast in order to improve the adhesion of the mark, or the paint film.

After the golf ball body has been prepared, the mark is formed on the surface of the golf ball body. As the method for forming the mark on the surface of the golf ball body, the conventional method can be employed. Examples of the method for preparing the mark are a thermal transfer method where the mark is transferred at the heating condition with the transfer foil, and a pad printing method where the mark is transferred by the transfer pad. After the mark is formed in such a way with the ink composition, it is preferable to continuously apply a paint and form a paint film. After the mark is printed and the paint is applied, the mark and the paint film are formed by drying the golf ball at the temperature of 30 to 60° C. for about 1 to 6 hours.

Although the method for preparing the golf ball is explained based on the embodiment of the two-piece golf ball, the wound core can be used for preparing a wound golf ball, and at least one intermediate layer can be formed between the core and the cover for preparing the multi-piece golf ball including at least three layers.

For preparing a wound core golf ball, a conventional wound core can be used in the present invention. The wound core comprises a center and a rubber thread layer which is formed by winding a rubber thread around the center in an elongated state. Examples of the center are a liquid center and a solid center formed of rubber. In the present invention, the rubber thread, which is conventionally used for winding around the center, can be adopted for winding around the center. The rubber thread, for example, is obtained by vulcanizing a rubber composition including a natural rubber, or a mixture of natural rubber and a synthetic polyisoprene, a sulfur, a vulcanization auxiliary agent, a vulcanization accelerator, and an antioxidant. The rubber thread is wound around the center in elongation of about 10 times length to form the wound core.

When preparing a multi-piece golf ball comprising at least three layers, the intermediate layer includes, for example, a thermoplastic resin such as a polyurethane resin, an ionomer resin, Nylon, and a polyethylene; a thermoplastic elastomer such as a polystyrene elastomer, a polyolefin elastomer, a polyurethane elastomer, a polyester elastomer, a polyamide elastomer.

Examples of the ionomer resin are one prepared by neutralizing at least a part of carboxyl groups in a copolymer composed of ethylene and $\alpha,\beta$-unsaturated carboxylic acid with a metal ion, and one prepared by neutralizing at least a part of carboxyl groups in a terpolymer composed of ethylene, $\alpha,\beta$-unsaturated carboxylic acid and $\alpha,\beta$-unsaturated carboxylic acid ester with a metal ion. Examples of the $\alpha,\beta$-unsaturated carboxylic acid are acrylic acid, and methacrylic acid. Examples of the $\alpha,\beta$-unsaturated carboxylic acid ester are methyl ester, ethyl ester, propyl ester, n-butyl ester, isobutyl ester and the like of acrylic acid, methacrylic acid. The metal for neutralizing the carboxyl group includes alkali metal such as sodium, potassium, and lithium; or alkali earth metal such as magnesium, calcium; or divalent transition metal such as zinc, and copper. Further, the above ionomer resin can be used as the mixture thereof in order to obtain the desired resilience and hardness. The intermediate layer may further include a gravity adjusting agent such as barium sulfate and tungsten, an antioxidant and a colorant.

Presently, in the case of the large size golf ball, the golf ball is required by a rule to be not more than 45.92 g in mass, but there is no limitation on the lower limit. The mass of the golf ball is preferably not less than 44.0 g, more preferably not less than 44.2 g, and is preferably not more than 45.8 g. If the golf ball has a mass of less than 44.0 g, the golf ball loses inertia during the flying and thus loses the speed during the last half of the flying. As a result, the flying distance is lowered. If the golf ball has a mass of more than 45.8 g, the shot feeling becomes heavy.

The golf ball of the present invention preferably has a diameter of 41.0 mm to 44.0 mm, more preferably has a diameter of 42.67 mm or more, and even more preferably about 42.75 mm, which satisfy the specification of the large-size golf ball.

EXAMPLES

The following examples illustrate the present invention, however these examples are intended to illustrate the invention and are not to be construed to limit the scope of the present invention. Many variations and modifications of such examples will exist without departing from the scope of the inventions. Such variations and modifications are intended to be within the scope of the invention.

[Evaluation Method]

(1) Luster (Brilliance)

The golf balls where the mark was formed were visually observed and evaluated according to the following criteria.

E (Excellent): The luster was even more sharply observed.
G (Good): The luster was sharply observed.
F (Fair): The luster was slightly observed (allowable range).
P (Poor): The luster was not observed.

(2) Visibility

The golf ball having a mark thereon was located on the grass in a fine weather. Ten golfers approached the golf ball gradually from the position which was as far as 50 m from the golf ball, and registered the distance between the golf ball and the position where the golfer recognized the existence of the mark on the golf ball. The distances of the ten golfers were averaged and regarded as the result of each golf ball.

(3) Durability

Each golf ball was hit 100 times repeatedly with a driver (W#1) attached to a swing robot manufactured by TRU-ETEMPER CO, at the head speed of 45 m/sec. The durability was evaluated by observing the peeled condition of the mark based on the following criteria.

E (Excellent): The mark did not peel off.
G (Good): The area where the mark peeled off was not more than 1 $mm^2$.
F (Fair): The area where the mark peeled off was more than 1 $mm^2$ to 4 $mm^2$ (allowable range).
P (Poor): The area where the mark peeled off is more than 4 $mm^2$.

[Production of the Two-piece Golf Ball]

(1) Preparation of Solid Core

The rubber composition shown in Table 1 was kneaded and pressed in upper and lower molds each having a spherical cavity at the heating condition of 160° C. for 13 minutes to obtain the solid core in a spherical shape having a diameter of 39.3 mm.

TABLE 1

| Core formulation | Amount(parts) |
| --- | --- |
| Polybutadiene rubber | 100 |
| Zinc oxide | 5.6 |
| Zinc acrylate | 22.0 |
| Calcium carbonate | 21.0 |
| Dicumyl peroxide | 1.85 |

Note on Table 1:
Polybutadiene rubber: BR-11 (cis content: 96%) available from JSR Co.
Zinc acrylate: "ZNDA-90S" produced by NIHON JYORYU KOGYO Co, .LTD.
Zinc oxide: "Ginrei R" produced by Toho-Zinc Co.
Dicumyl peroxide: "Percumyl D" produced by NOF Corporation (2) Preparation of the Cover Material The materials shown in Table 2 were mixed using a twin-screw kneading extruder to obtain the cover composition in the form of pellet. The extrusion was conducted in the following conditions:

screw diameter=45 mm,
screw revolutions=250 rpm,
screw L/D=35, and the cover composition was heated to from 200° C. to 260° C. at the die position of the extruder.

TABLE 2

| Cover material | Amount (parts) |
| --- | --- |
| HIMILAN 1605 | 40 |
| HIMILAN 1706 | 30 |

TABLE 2-continued

| Cover material | Amount (parts) |
| --- | --- |
| HIMILAN 1707 | 30 |
| Titanium oxide | 2 |

Notes on Table 2:
HIMILAN 1605: an ionomer resin of a sodium ion-neutralized ethylene-methacrylic acid copolymer, available from MITSUI-DUPONT POLYCHEMICAL CO., LTD.
HIMILAN 1706: an ionomer resin of a zinc ion-neutralized ethylene-methacrylic acid copolymer, available from MITSUI-DUPONT POLYCHEMICAL CO., LTD.
HIMILAN 1707: an ionomer resin of a sodium ion-neutralized ethylene-methacrylic acid copolymer, available from MITSUI-DUPONT POLYCHEMICAL CO., LTD.

(3) Preparation of the Golf Ball Body

The cover composition thus prepared was directly injection-molded onto the core to form the cover, thereby obtaining the two-piece golf ball having a diameter of 42.7 mm.

The upper and lower molds for forming the cover have a spherical cavity with dimples. The part of the dimples can serve as a hold pin which is retractable. When forming the golf ball body, the hold pins were protruded to hold the core, and the resin heated at 210° C. was charged into the mold held under the pressure of 80 tons for 0.3 seconds. After the cooling for 30 seconds, the molds were opened and then the golf ball body was discharged.

(4) Printing a Mark and Forming a Paint Film

As shown in table 3, the ink composition for the mark was prepared. The mark "X" of width 8 mm, height 8 mm, line width 2 mm was printed by the pad stamp using the ink compositions shown in Table 3. Then, the urethane paint was coated thereto with the air-gun. The paint was dried in the oven heated at 40° C. for 4 hours to obtain the golf ball. The luster, the visibility and the durability of the mark were evaluated in terms of each golf ball. The results were also shown in Table 3.

As the urethane paint, the following paint was used.

(i) Base material: Urethane polyol 60 parts by mass of PTMG250 (BASF Co., polyoxytetramethyleneglycol), 54 parts by mass of 550U (Sumitomo-Bayer Urethane Co., Ltd, branched polyol having a molecular weight of 550) were dissolved into 120 parts by mass of the solvent (toluene and methylethylketone). The dibutyl-tin-dilaurylate was added in an amount of 0.1 mass % with respect to the total base material. While keeping this polyol at 80° C., 66 parts by mass of isophorone diisocyanate was slow-added into the polyol to obtain a urethane polyol having a solid content of 60 mass %, hydroxyl value of 75 mgKOH/g, and a molecular weight of 7808.

(ii) Curing agent: Isophorone diisocyanate available from Sumitomo-Bayer Urethane Co., LTD.
(iii) Mixing ratio: NCO (curing agent)/OH (base material)=1.2 molar ratio.
(iV) The light-stabilizer (2 parts), an UV-absorber (2 parts), a fluorescent brightener (0.2 part) described below were added into 100 parts by mass of the above two-component curing type urethane resin component to obtain the urethane paint.

Light stabilizer: Sanol LS770 available from Sankyo Lifetech Co., LTD.
UV-absorber: Tinuvin 900 available from Ciba-Geigy Limited
Fluorescent brightener: Ubitex OB available from Ciba-Geigy

TABLE

| | Golfball No. | | | | | | | | | | |
|---|---|---|---|---|---|---|---|---|---|---|---|
| | 1 | 2 | 3 | 4 | 5 | 6 | 7 | 8 | 9 | 10 | 11 |
| Ink composition | | | | | | | | | | | |
| Epoxy resin | 35.8 | 37 | 35 | 35 | 31 | 22 | 17.5 | 36 | 35 | 35 | 35 |
| Curing agent | 2.5 | 1 | 1 | 1 | 1 | 0.5 | 0.5 | 2.5 | 1 | 1 | 1 |
| Solvent | 47.8 | 49 | 46.8 | 46.8 | 41.5 | 27.5 | 23 | 48 | 46.8 | 46.8 | 46.6 |
| Flatting agent | 7.4 | 4.5 | 4 | 4 | 3.5 | 3 | 2.5 | 7.5 | 4 | 4 | 4 |
| Pigment(phthalocyanine blue) | 6 | 3.5 | 3.2 | 3.2 | 3 | 2 | 1.5 | 6 | 3.2 | 3.2 | 3.2 |
| Antisettling agent | — | — | — | — | — | — | — | — | — | — | 0.2 |
| Luster material 1 | 0.5 | 5 | 10 | — | 20 | 45 | 55 | — | — | — | 10 |
| Luster material 2 | — | — | — | 10 | — | — | — | — | — | — | — |
| Luster material 3 | — | — | — | — | — | — | — | — | 10 | — | — |
| Luster material 4 | — | — | — | — | — | — | — | — | — | 10 | — |
| Ink Composition | 100 | 100 | 100 | 100 | 100 | 100 | 100 | 100 | 100 | 100 | 100 |
| Luster material/Pigment | 0.08 | 1.43 | 3.13 | 3.13 | 6.67 | 22.5 | 36.67 | — | 3.13 | 3.13 | 3.13 |
| Evaluation | | | | | | | | | | | |
| Luster | F | G | E | E | E | E | E | P | P | P | E |
| Visibility(m) | 7.1 | 13.5 | 14.1 | 13.6 | 14.5 | 15 | 15.2 | 6 | 6.4 | 6.1 | 14.1 |
| Durability | E | E | E | E | G | F | F | E | F | E | E |

Ink composition: mass %

Epoxy resin: two-component curing type PAD-EPH ink available from Navitas Corporation
Curing agent: Hexamethylene diisocyanate
Luster material 1: Metashine MEG40PS available from Nihon Sheet Glass Co, a glass flake coated with silver
Luster material 2: Metashine MC1040NB available from Nihon Sheet Glass Co, a glass flake coated with nickel
Luster material 3: an aluminum flake having an average particle size of 11.6 μm and a thickness of 20 Å
Luster material 4: Metashine MC1080RG available from Nihon Sheet Glass Co, having an average particle size of 80 μm, and an average thickness of 1 μm, a glass flake coated with titanium oxide
Antisettling agent: aerosil available from Nippon Aerosil Co., LTD.
Solvent: a mixture of 50 mass % methoxymethylbutylacetate, 20 mass % acetylacetone, 6 mass % propyleneglycol monomethylether acetate, 4 mass % ethylacetate, 20 mass % an aromatic hydrocarbon The golf balls No. 1 to No. 7 and No. 11 are the golf balls where the mark was formed with the ink composition comprising the pigment and the luster material having the core layer with the smooth surface and the metal coated on the core layer. All of the golf balls were excellent in the luster, the visibility and the durability. The comparison among the golf balls No. 1 to No. 3 indicated that the luster becomes stronger as the content of the luster material was increased. The comparison among the golf balls No. 4 to No. 7 indicated that the durability was slightly lowered when the content of the luster material was excessively high.

The golf ball No. 8 is the case that the ink composition for printing the mark did not contain the luster material. The golf ball No. 9 is the case that the ink composition contained an aluminum flake as the luster material. The golf ball No. 10 is the case that the ink composition contained the luster material where a glass flake is coated with titanium dioxide. In any case, the luster was not developed.

The present invention can be preferably applied to a golf ball where the individualized appearance, the improved visibility, and the durability of the mark are required.

This application is based on Japanese Patent application No. 2,005-181,273 filed on Jun. 21, 2005, the contents of which are hereby incorporated by reference.

What is claimed is:

1. A golf ball comprising a mark made from an ink composition,
    wherein the ink composition comprises:
    a pigment, and
    a luster material having a core layer with a smooth surface and a metal coating on the core layer, wherein the core layer is a glass flake and silver is coated on the glass flake as the metal coating.

2. The golf ball according to claim 1, wherein the core layer is further covered with a resin or an inorganic material at the surface of the metal coating on the core layer.

3. The golf ball according to claim 1, wherein the ink composition comprises the luster material in an amount of 1 to 20 mass %.

4. A golf ball comprising a mark made from an ink composition,
    wherein the ink composition comprises:
    a pigment, and
    a luster material having a core layer with a smooth surface and a metal coating on the core layer, wherein the core layer is a glass flake and nickel is coated on the glass flake as the metal coating.

5. The golf ball according to claim 4, wherein the core layer is further covered with a resin or an inorganic material at the surface of the metal coating on the core layer.

6. The golf ball according to claim 4, wherein the ink composition comprises the luster material in an amount of 1 to 20 mass %.

7. A golf ball comprising a mark printed with an ink composition,
    wherein the ink composition comprises:
    a base resin,
    a pigment, and
    a luster material having a core layer with a smooth surface and an elementary metal coated on the smooth surface of the core layer, wherein the core layer is a glass flake and a silver layer is coated on the glass flake as the metal layer.

8. The golf ball according to claim 7, wherein the core layer is further covered with a resin or an inorganic material at the surface of the metal coating on the core layer.

9. The golf ball according to claim 8, wherein the ink composition comprises the luster material in an amount of 1 to 20 mass %.

10. The golf ball according to claim 9, wherein the ink composition comprises an epoxy resin as the base resin.

11. The golf ball according to claim 10, wherein the ink composition further comprises a polyisocyanate as a curing agent.

12. The golf ball according to claim 11, wherein the ink composition further comprises a solvent.

13. The golf ball according to claim 12, wherein the ink composition further comprises an antisettling agent.

14. A golf ball comprising a mark printed with an ink composition, wherein the ink composition comprises:
a base resin,
a pigment, and
a luster material, having a core layer with a smooth surface and a layer of an elementary metal coated on the smooth surface of the core layer, wherein the core layer is a glass flake and a nickel layer is coated on the glass flake as the metal layer.

15. The golf ball according to claim 14, wherein the core layer is further covered with a resin or an inorganic material at the surface of the metal coating on the core layer.

16. The golf ball according to claim 15, wherein the ink composition comprises the luster material in an amount of 1 to 20 mass %.

17. The golf ball according to claim 16, wherein the ink composition comprises an epoxy resin as the base resin.

18. The golf ball according to claim 17, wherein the ink composition further comprises a polyisocyanate as a curing agent.

19. The golf ball according to claim 18, wherein the ink composition further comprises a solvent.

* * * * *